United States Patent [19]

Diekhans et al.

[11] Patent Number: 4,942,724
[45] Date of Patent: Jul. 24, 1990

[54] APPARATUS AND METHOD FOR CHANGING THE POSITION OF A MOWING MECHANISM

[75] Inventors: Norbert Diekhans, Gütersloh; Werner Fitzner, Sassenberg; Heinrich Ostrup, Harsewinkel, all of Fed. Rep. of Germany

[73] Assignee: CLASS OHG, Harsewinkel, Fed. Rep. of Germany

[21] Appl. No.: 321,595

[22] Filed: Mar. 9, 1989

[30] Foreign Application Priority Data

Mar. 9, 1988 [DE] Fed. Rep. of Germany ....... 3807610

[51] Int. Cl.$^5$ ............................................. A01D 35/00
[52] U.S. Cl. ................................................... 56/10.4
[58] Field of Search ....................... 56/10.2, 10.4, 15.3, 56/15.7

[56] References Cited

U.S. PATENT DOCUMENTS

| | | | |
|---|---|---|---|
| 4,495,754 | 1/1985 | Cartner | 56/10.4 X |
| 4,506,464 | 3/1985 | Cartner | 56/10.4 X |
| 4,518,043 | 5/1985 | Anderson et al. | 56/10.4 X |

FOREIGN PATENT DOCUMENTS

| | | |
|---|---|---|
| 2900320 | 7/1980 | Fed. Rep. of Germany ....... 56/10.4 |
| 3230330 | 8/1982 | Fed. Rep. of Germany . |
| 3326666 | 7/1983 | Fed. Rep. of Germany . |
| 3430125 | 8/1984 | Fed. Rep. of Germany . |
| 3522699 | 6/1985 | Fed. Rep. of Germany . |

Primary Examiner—Thuy M. Bui
Attorney, Agent, or Firm—Browdy and Neimark

[57] ABSTRACT

A positional regulation of a mowing mechanism is effected in terms of height as a function of a ground pressure signal (SB) and in terms of swiveling in the transverse direction as a function of lateral ground clearance signals (SL, SR), the adjusting signals being carried to hydraulic valves (VT, VH; VL, VR).

The goal is to increase the accuracy and freedom from fluctuation in the course of the mowing mechanism cutting height.

The ground clearance signals (SL, SR) are used in proportion with the ground pressure signal (SB) for vertical position regulation. A linkage of these signals (SL, SR, SB) with further transducer signals and a method for automatic adaptation of the regulating characteristic by varying the hystereses and idle times of the regulators (V1, V1) is disclosed.

The regulating apparatus is used in harvesting and threshing combines when low-height crops are to be mowed and when the ground is bumpy and soft.

28 Claims, 4 Drawing Sheets

APPARATUS AND METHOD FOR CHANGING THE POSITION OF A MOWING MECHANISM

BACKGROUND

1. Field Of The Invention

The invention relates to a regulating apparatus on a self-propelled harvester having a mowing bar which is swivelable by hydraulic control in a vertically adjustable manner and transversely to the direction of travel, and which has ground scanners on the sides, the ground clearance signals of which are supplied to a control apparatus to regulate a swiveling motion transverse to the direction of travel.

2. The Prior Art

German Pat. No. DE-A 35 22 699 discloses a self-propelled harvester with a mowing bar disposed on the front and having the scanners scanning the contour of the ground; the signals of the scanners swivel the mowing bar transversely or longitudinally of the travel direction, by hydraulic control.

German Pat. No. DE-A 32 30 330 also discloses a self-propelled harvester having a mowing bar swivelable by hydraulic control by means of a ground pressure sensor in order to adjust the cutting height.

A combined harvester and thresher is also known from German Pat. No. DE-C 33 32 763 having an inclination sensor, which serves to effect hydraulic control of an actuation device of a top sifter, for the sake of uniform distribution of the harvest in a feeder and cleaning and apparatus that swivels back and forth.

These known harvesters have the disadvantage that the regulating apparatus for swiveling the mowing bar, the cutting height adjustment means, and the harvest distribution means operate completely independently of one another, so that the different time constants of the adjusting circuit can result in disruptive coupling vibrations; especially when moving at high speed and over soft and/or bumpy ground, this does not allow uniformly short cutting and carries the risk that the harvester may become bogged down or the mowing beam may be damaged.

BRIEF SUMMARY OF THE INVENTION

It is the object of the invention to disclose a self-propelled harvester with a high harvesting yield and a uniform short cutting height, even over steeply sloping, soft, bumpy ground.

The object is attained by providing that the difference between the ground clearance signals is utilized for regulating the swiveling, and the mean value of the ground clearance signals serves an actual-value component for regulating a cutting height of the mowing bar.

Advantageous embodiments are defined by the dependent claims.

It has proved to be particularly advantageous to dispose a plurality of ground scanners in groups, on both sides of the mowing bar, and to perform the regulation with respect to the maximum deflection of the various groups; in this way furrows running longwise with the direction of travel do not affect regulation, and the mowing mechanism blades are prevented from sinking in too deep.

It has also proved to be advantageous in regulating the cutting height to obtain the actual signal predominantly from a ground pressure signal of the mowing bar and to a small extent, for instance up to approximately 20%, from the mean value of the ground scanners, and to incorporate the ground pressure in a predetermined operating range elastically in a spring, thereby preventing fluctuations in the cutting height adjustment resulting from relatively small bumps in the ground.

The comparators of the regulators are provided with a hysteresis that precludes an overload of the hydraulic adjusting members when the ground has closely-spaced bumps. The adjusting members are additionally secured by thermal safety switches against destruction from an overload.

Since in the operating region of a harvester, there may also be obstacles that exceed a given stubble height, such as rocks, ditches, animals, and so forth, an oversteer option in the regulation is provided, in which the originally specified setpoint value of the cutting height is maintained, and thus need not be reset once the obstacle is overcome. The oversteer scanners are advantageously suitable for long-term manual operation as well, so that emergency operation is possible even if the regulating apparatus is absent or defective.

Advantageously, the inclination sensor that serves to regulate the sifter apparatus can be used instead of the ground scanners to regulate the lateral swiveling of the mowing bar, for instance if one of the ground scanners is damaged or if a relatively high stubble height is specified, making scanning of the ground unnecessary. If a ground scanning means is always provided, then conversely the inclination sensor becomes unnecessary, and the sifter apparatus is regulated with the differential signal of the ground scanners.

Particularly advantageously, the regulating apparatus may be embodied by a microprocessor, because in it the actual values entered relating to a particular specified operating region can be evaluated in a simple manner. Moreover, the particular hysteresis range and the idle time of the set-point/actual-value comparison is suitably specified and varied as needed. These specifications and variations of the regulating characteristic effected thereby are advantageously derived from the incident reactions of the regulating apparatus, for instance from the periodicity or from the proximity to the limit load, and moreover are optimally ascertained as a function of operating conditions such as travel speed, ground roughness, cutting height, and so forth. This makes it advantageously simple to achieve a proportional-integral-differential regulating characteristic with dynamic parameter adaptation.

The entry by the operator of the set-point value for the cutting height and other operating parameters for the regulating characteristic can simply be performed by monitoring the timing of operating contacts, without using analog transducers.

The function of the regulating circuits is advantageously monitored continuously by monitoring the reaction time and by monitoring the scanner and transducer signals as to their position in the particular operating range; in the case of a malfunction, there is automatic recourse to an auxiliary function. The actual-value potentiometers are dimensioned with respect to the specified mechanical adjustment range in such a way that the associated electrical adjustment range does not encompass the entire operating range from 0 to 100% of the supply voltage, but only a partial range of approximately 5% to 95%. If the measured actual values are nevertheless outside this adjusting range, then a malfunction is occurring, such as a break in a line or damage to the mechanical scanning or coupling members, and this can be monitored and recognized, whereupon the associated transducer potentiometer is eliminated from the further evaluation. The particular operating range of the scanners and transducers is detected automatically and stored in memory for the purpose of monitoring and evaluation. Sporadic malfunctions are detected statistically and made available for sampling.

Advantageous embodiments are shown in FIGS. 1 through 6.

DETAILED DESCRIPTION OF THE PREFERRED EMBODIMENT

Figure 1:
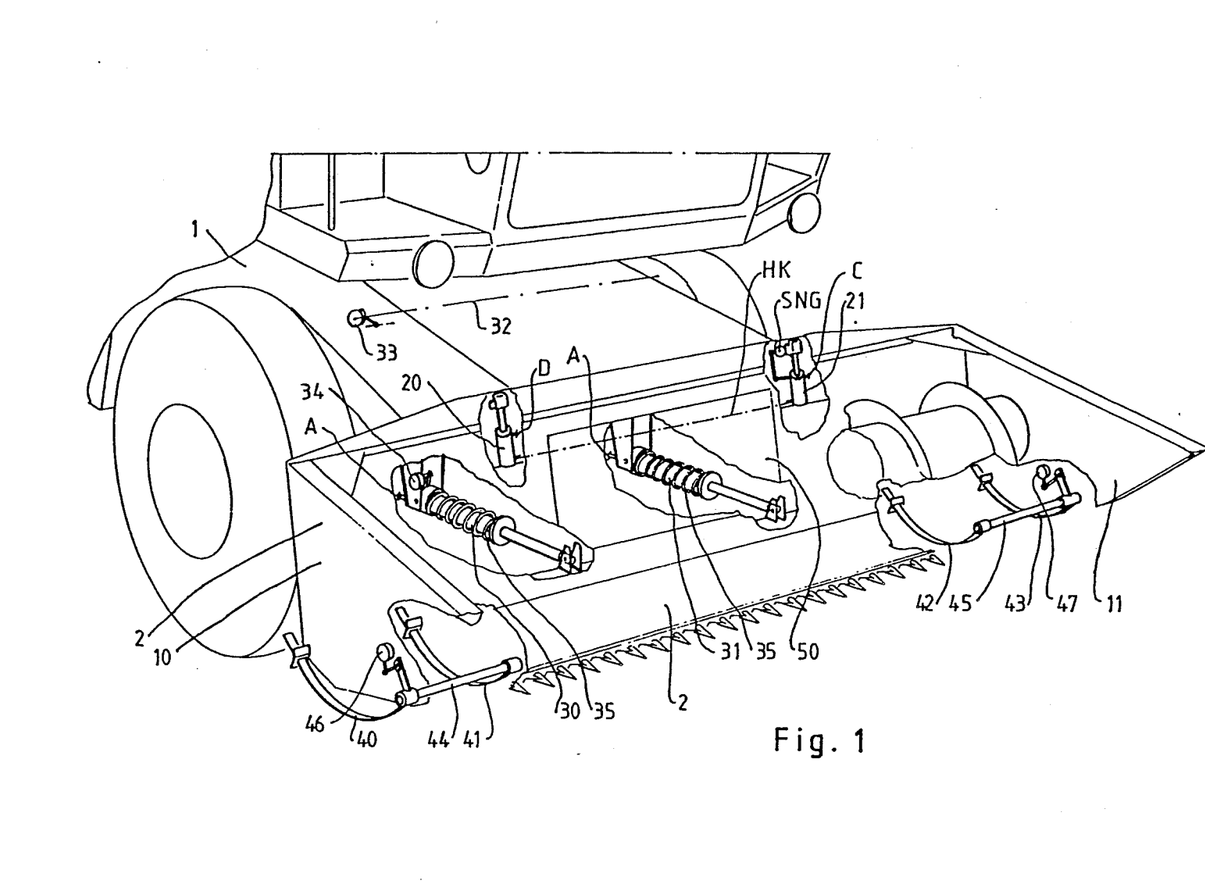
FIG. 1 is a perpective view in detail of a harvester, seen in X-ray fashion.

FIG. 1 shows a self-propelled harvester (1) having a mowing bar (2), which is swiveable and within narrow limits is adjustable in height by means of hydraulic swivels (20, 21) about the center axis of the harvester (1). The hydraulic cylinders of the swivels (20, 21) are connected in series via a coupling line (HK). They are acted upon in alternation for swiveling via control valves at the mirror-symmetrically arranged connections (CD). The mowing bar (2) is also swivelable in height about a swivel axis (32) by means of parallel-connected hydraulic cylinders (30, 31). Elastic ground scanners (40, 41; 42, 43) are disposed on both side walls (10, 11) and coupled in pairs, each pair to one scanner potentiometer (46, 47), via a rotationally supported coupling shaft (44, 45). The elasticity of the ground scanners (40, 41; 42, 43) adapts them to an average ground level. The parallel disposition of hoops via the shafts (44, 45) spaced apart by a distance that is suitably greater than the typical track width of a tire of an agricultural machine and greater than the width of a furrow, the maximum ground height is reported, and a tire track, furrow or small hole does not affect the outcome.

Figure 2:
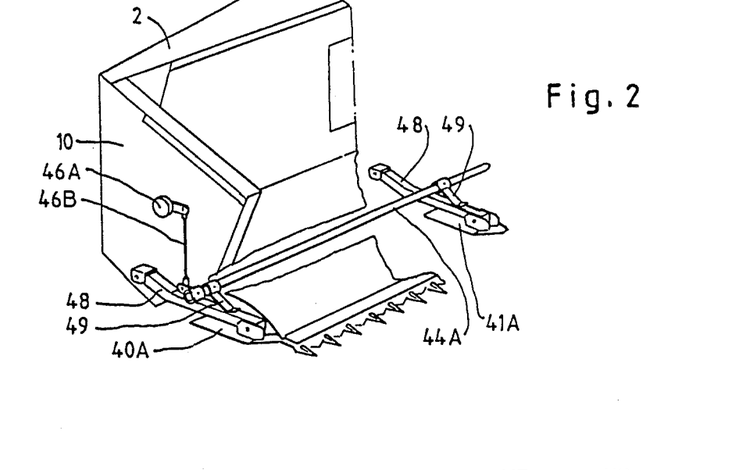
FIG. 2 shows a further detail of a feature of a ground scanner.

The swiveling and height of the mowing bar (2) with respect to the vehicle is reported by a height potentiometer (33). The ground pressure is also signalled by means of a ground pressure potentiometer (34), which is adjusted in accordance with the deformation of the support springs (35) of the hydraulic cylinders (30, 31). Alternatively, the ground pressure can also be obtained by means of a pressure pickup from the hydraulic line (A) of the hydraulic cylinders (30, 31). The grain lifter and mechanisms for feeding in the harvested grain are shown in only rudimentary form. The harvested material is fed through the feed shaft (50) into the thresher, where the sifter apparatus (not shown) is disposed. Located on it are a pendulum-actuated position sensor for the vehicle (1) and a sifter drive that is hydraulically adjustable in a controlled manner. FIG. 2 shows a detail of a different kind of ground scanner embodiment on the support of a flexible cutter bar (2). Scanner skids (40A, 41A) are swiveably supported on guide arms (48), and their swiveled position is transmitted by scanner arms (49) to the connecting shaft (44A), the rotational angle of which is transmitted via a transmission rod (46B) to the potentiometer (46A).

Figure 3:
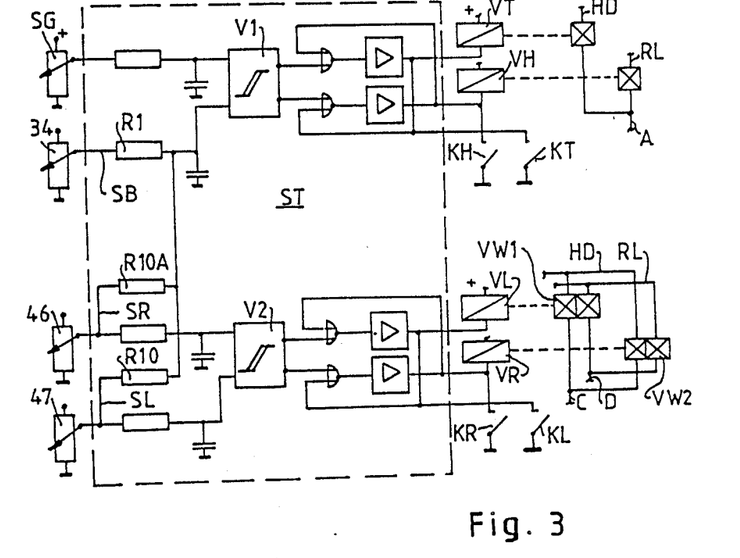
FIG. 3 shows a regulator circuit of the analog type.

FIG. 3 shows a schematic regulating circuit (ST). The scanning and ground pressure potentiometer (46, 47, 34) and electromechanical hydraulic valves (VL, VR; VT, VH) for the hydraulic cylinders of the swivels (20, 21) and for raising and lowering with the hydraulic cylinders to adjust the cutting height are connected to an electronic control unit (ST). From a control panel, a cutting height transducer (SG) also leads to the control unit (ST), and control contacts (KT, KH; KL, KR) that are connected in parallel with the control outputs of the control unit are disposed on the control panel. These contacts enable oversteering of the regulating apparatus by hand, for instance to overcome obstacles in the travel path or in turning the vehicle, and also enable purely manual operation, for instance if the regulating apparatus is absent or defective.

The control unit (ST) is made by analog technology. It includes comparators (V1, V2) with hysteresis, the outputs of which act upon the valves (VT, VH; VL, VR) via amplifiers. The first comparator (V1) is connected at one input to the ground pressure set-point value transducer (SG), and at its second input an actual signal is supplied via an adding resistor network, which comprises a first resistor (R1) and two resistors (R10, R10A), of equal size and approximately ten times higher resistance; of these, the first resistor is connected to the ground pressure signal (SB), which is emitted by the ground pressure potentiometer (34), and the other resistors (R10, R10A) are connected to the ground clearance signals (SR, SL) of the ground scanners (46, 47). In this way the raising and lowering takes place substantially as a function of the ground pressure on the pan of the mowing bar, and to a certain fractional extent of approximately 20% by means of the summing signal of the height scanner, which indicates the average cutting height. The assumption here is that the network resistors (R1, R10, R10A) are large compared with the potentiometer resistors. The valves (VH, VT) connect the cylinder connection (A) to the oil pressure line or the return line (HD, RL).

The ground clearance signals (FR, FL) are evaluated differentially in the second comparator (V2), with the output signals of which the swiveling to the left and right is controlled via four-way valves (VW1, VW2). These valves respectively connect the oil pressure line (HD) and the return line (RL) to one of the two connections (C, D) of the two swivels (20, 21)—see FIG. 1 in alternation. The swivels (20, 21) are each coupled at one end to an oil communication line (HK), so that raising one side lowers the other, and vice versa, and so swiveling takes place while the average position and a favorable cross section of the feed chute (50) are maintained; FIG. 1.

The comparator inputs are provided with integration elements to suppress interference, and the comparator outputs lead via mutual shutoff elements, which prevent the control contacts from being inadvertently switched on simultaneously, even if an oversteering actuation of the control contacts (KT, KH; KL, KR) occurs.

Figures 4, 6:
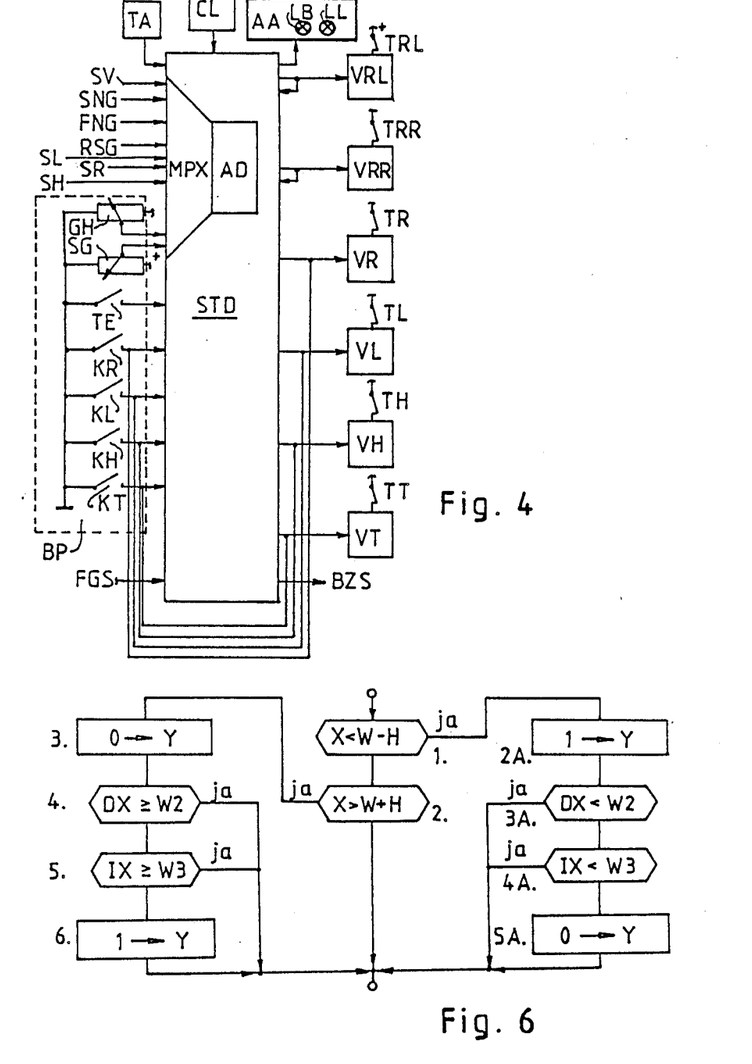
FIG. 4 is a block circuit diagram of a digital control apparatus.
FIG. 6 shows a flow chart of an adaptation function.

FIG. 4 is a block circuit diagram of a digital control unit (STD), which is compatible with the analog control unit (ST) in FIG. 3 but includes additional functions. The contacts (KT, KH, KR, KL), the valves (VT, VH, VL, VR) and the signal transducers (SG, SB, SL, SR) are identical. All the operating elements are disposed on a control panel. In addition, thermal safety switches (TT, TH, TL, ZR, TRR, TRL) are shown, by way of which the voltage supply to the various valves is carried. Also shown are the elements provided for regulating the riddle sifter. For this purpose, the undercarriage inclination transducer (FNG) and position transducer for the riddle sifter actuation, namely the riddle sifter transducer (RSG), are provided. To enable a controllable swiveling of the mowing bar even without ground scanning, a cutting mechanism inclination transducer (SNG) is also disposed on one of the swivels (21); see FIG. 1. Moreover, the height potentiometer (33), which emits a height position signal (SH) for the vertical swiveling of the cutting mechanism about its swivel axis on the undercarriage, is carried to the input. A further height signal (SV) from a further potentiometer is optionally also supplied to the control unit (STD), which via a control shaft extending over the entire mowing mechanism transmits the position of the uppermost of all the ground scanners (40-43) at a given time by means of pickups. A scanner (TE) on the operating apparatus is also provided, by means of which either the pickup of the actual signal for the ground pressure (SB) from the ground pressure potentiometer (34) or the pickup of the vertical position signal (SH) from the height potentiometer (33), optionally in combination with the height signal (SV), is determined. The regulation of ground pressure or vertical position is signalled to the operator by the operation indicator lamps (LV, LL). The transducer signals are carried via a controllable multiplexer (MPX) to an analog/digital converter (AD), the digital signals of which are processed under program control. The course of the program is controlled as a function of time by means of a clock (CL). The specified values are input via a keyboard (TA). The standardized actual values, for instance the ground pressure or the cutting mechanism height, are displayed on a display device (AA).

The program includes various subroutines, which perform various special functions. The regulation subroutine performs the function equivalent to that performed by the analog regulator, in that the signals are continuously selected, digitized and stored in memory in succession via the multiplexer (MVX). After that, the additive combining of the ground pressure signal value (SB) with the fractions of the left and right scanner signal value (SL, SR) and the comparison with the set-point value (SG) are performed, taking a hysteresis threshold into account. Depending on whether the signal exceeds this hysteresis threshold or drops below it, the valve adjustment raising or lowering signal is then emitted.

A comparison of the scanning signals taking a threshold value (SL, SR) is also performed, whereupon the control signal for swiveling to the right or the left is emitted depending on whether the signal exceeds the threshold, or fails to attain it.

In addition, the undercarriage inclination value (FNS) is compared with the riddle sifter signal value (RSG), taking a given hysteresis threshold into account, and as a function thereof if the threshold is exceeded or if the signal fails to attain it, the riddle sifter valve (VRL, VRR) adjusting to the left or right is actuated.

Moreover, a monitoring program of the digital input signals is performed cyclically, with which, as applicable, an actuation of a control contact (KT, KH, KL, KR) in the currentless state of the valves (VT, VH, VL, VR) is detected, and in the state where the valves do have current, their voltage supply via the thermal safety contacts (TT, TH, TL, TR, TRR, TRL) is detected by measurement of the residual voltage of the output switching amplifiers. In the event that a short circuit should be present at the output side, the measurement of the residual voltage of the output amplifiers and their monitoring with respect to an upper and lower threshold value provides further overload protection for the switch amplifiers at the outputs, in that an immediate shutoff takes place if there is an excessively high voltage loss with respect to the upper threshold value. The state without or with current is in each case briefly established during the signal evaluation, that is, at approximately 1% of the cycling time and correspondingly briefly with respect to the valve switching time, so that this does not affect the operating state. If one of the control contacts (KT, KH, KR, KL) is found to have been actuated, then the complementary valve in each case, which would direct a swiveling in reverse of that effected by the control contact, is either not switched on, if it is off, or is switched off, if it is on. The actuation of the control contacts, which primarily serve to oversteer the regulating apparatus, which is necessary to overcome obstacles or in turning, is evaluated in a further program feature such that the chronological sequence of actuation is analyzed, and the outcome of analysis triggers a control function. For instance, a brief succession of two short actuations can be utilized to effect the retention of the setpoint value, which in response to renewed brief key actuations is supplied to or withdrawn again from the regulator in alternation. This makes a great simplification in operation attainable, and analog transducers can be omitted. The set-point transducer (SG), as well, can be replaced or omitted in this way.

An advantageous program embodiment comprises the simulation of the thermal load on the valves by continuous accumulation of the various ON times, with appropriate reduction by a fraction corresponding to the accumulated value, the fraction representing the continuing cooling process. As a function of the thus-formed load value, if the exceeding of a specified load threshold value is ascertained, a shutoff of the associated valve takes place. However, preferably the attainment of the threshold value is prevented, by reducing the actuation frequency of the valve by increasing the associated hysteresis threshold, or specifying a longer switch idle time, the greater the load value ascertained. This also tends to prevent control deviations. Other load variables as well, such as the hydraulic temperature, can be measured or calculated and used as functional variables that determine the hysteresis values or the idle time.

By means of an autocorrelation analysis of the ON and OFF times of the adjusting signals over a plurality of switching events, undesired deviations are recognized, and a digital value is generated that is equivalent in magnitude to a possibly occurring periodicity, and this digital value is utilized to vary the hysteresis and/or idle time, which prevents control deviations from forming.

Another advantageous program comprises continuous monitoring of the operating ranges of the signal transducers (SR, SL, SD, SNG, FNG, RSG), resulting in an automatic adaptation of the actual values to the prevailing operating range, thereby making external zero-point adjustment unnecessary and providing for a continuous function monitoring, which is particularly important for the ground scanners because of the danger that their feelers may bend or break.

Figure 5:
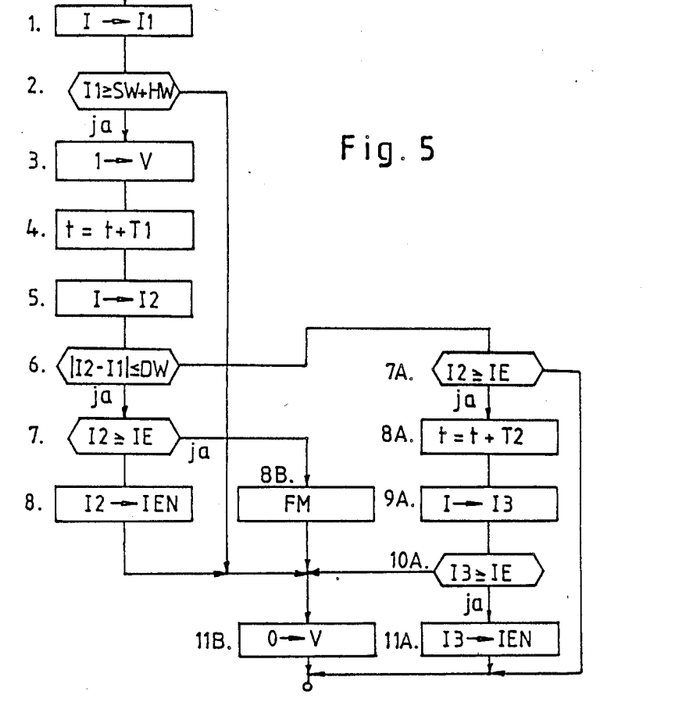
FIG. 5 is a flow chart of a controlled system.

FIG. 5 is a flow chart for a monitoring subroutine of this kind, which is performed for the various signals, for which purpose actual-value and final-value memories are furnished. In the first step, the pickup of a first measured value (I1) takes place; in the comparison step, which is the second program step, the measured value is compared with the set-point value (SW), minus the hysteresis value (HW). If the threshold has not been exceeded, then the associated valve is switched off in the next step; otherwise, in step 3, it is switched on. Next, in step 4, a timing program for an idle time (T1) of the adjusting means is run, which suffices for adjustment by a differential value (DW). In step 5, a further measurement of the second measured value (I2) then takes place, the difference of which from the first measured value (I1) is compared quantitatively with the differential value (DW). If the adjustment was not in accordance with expectations, then a variation via the threshold was not attained, and so the second measured value is compared in the seventh step with the stored final value (IE). If that value is not attained, then in the eighth step the new, lower second measured value (I2) is stored in memory as the new final value (IEN); however, if it has been attained, then this case of a regulation up to the range threshold is output to a display and to a statistical evaluation means or stored in memory.

In both cases, a shutoff of a valve takes place, and the program is exited. If in the sixth step the differential value (DW) was exceeded or attained, then subsequently the second measured value (I2) is likewise compared with the final value (IE), and if that value has not been attained the subroutine is exited; otherwise, in an eighth step, a second idle time program (T2) is run through, after which, in step 9, a third measured value (I3) is measured, which is compared in step 10 with the final value (IE). If that final value is still valid, then the valve is switched off and the program is exited; however, if it has been exceeded, then the new, higher value is stored in memory as the new final value (IEN).

For regulation in the other direction, a corresponding program having the other final value is run through. The evaluation of the various measured values takes place in each case in the range between the respective lower and upper final value, so that the measurement potentiometers should be operated in a middle range, and the particular location of the measurement range will not affect the regulation.

Instead of the potentiometer type of measured value transducers, other transducers, such as those using ultrasound, may be used, even if their signal level deviates from the typical potentiometer signal levels, because the jointly running evaluation of the final value in each case results in an automatic adaptation of the measurement range.

A further advantageous program feature is that the signal of the undercarriage inclination transducer (FNG) is used for regulating the swiveling of the mowing bar. This is advantageous if a relatively high cutting height is selected and ground scanners cannot be used. If the soil is loose, it can be assumed that an undercarriage inclination will come about from sinking into the earth on one side or running into a longitudinal furrow or tire track groove. Thus a counterswiveling of the mowing bar is helpful. For this reason, from the undercarriage inclination, a set-point value for the swiveling regulator is derived, to which the cutting mechanism inclination signal (SNG) of a transducer is supplied as an actual value, this signal for instance signalling the adjustment of one swivel (21).

A further option for simplifying the mechanical ground scanning is that instead of a connecting shaft for two parallel scanner skids, with this shaft emitting the higher of the two levels to a potentiometer by its rotation, one potentiometer is disposed on each skid, and their signals are compared, preferably after the digital conversion, and then used as the respective higher signal for actual value formation.

An advantageous program feature shown in FIG. 6 provides a three-point regulation with a proportional-integral-differential characteristic and dynamic adaptation of the regulating parameters. In a first step of comparison of the actual value (X) with the set-point value (W), taking a hysteresis (H) into account, it is ascertained whether the actual value has fallen below the set-point value. In that case, the adjusting member (Y) that suitably operates in the opposite direction is activated in the second step.

In a third step, the variation over time (DX) of the actual value (X) is compared with a second comparison value (W2). If the variation is less, the subroutine is ended; otherwise, in a fourth step, an integral value (IX) of the actual value (X), which is continuously formed as a summation value of the variations (DX) over a given integration period, is compared with a third comparison value (W3), and if that value is exceeded, then in a fifth step the adjusting member (Y) is deactivated. If in the first comparison step the set-point value (W) having the hysteresis (H) was exceeded by the actual value (X), then in a second comparison step it is checked whether the set-point value (W) itself is exceeded; if that is the case, then the adjusting element (Y) is deactivated in step 3. In a fourth step, checking of the variation (DX) as to whether it has dropped below the second comparison value (W2) is done, and if that is the case, then in a fifth step a comparison of the integral value (IX) with the third comparison value (W3) takes place, and if the value has dropped below it the adjusting element (Y) is activated, after which the program is ended. In all the alternative comparison outputs not pursued, as well, the program cycle is ended.

Another simple option for dynamic adaptation comprises varying the hysteresis in proportion to the actual speed value.

The adaptation of the regulation behavior can be performed very favorably by varying the integration time. To this end, the load values ascertained in the other subroutine, and a vehicle speed signal (FGS)—see FIG. 4—as well can be used, which is supplied by the vehicle control system or a suitable transducer to the control unit (STD). The frequency of switchover of the adjusting elements is advantageously cyclically accumulated in a memory, from which an operating state signal (BZS) is derived and output to the undercarriage control and/or to the operator.

The various subroutines shown are activated cyclically in a known manner by a master program and performed, being supplied with the various parameters such as comparison values, threshold values and so forth of the regulators, transducers and so forth. The exceeding of threshold values, or relatively long persistance in the vicinity of the threshold value, the occurrence of unauthorized operating states, as well as the time in service and switching frequency of components subject to wear, such as valves and so forth, are suitably statistically detected and can be read out for maintainance purposes.

We claim:

1. A regulating apparatus on a self-propelled harvester (1) having a mowing bar (2), which is swiveable under hydraulic control in a vertically adjustable manner and transversely to the travel direction, and which has ground scanners (40–47) on the side, ground clearance signals (SR, SL) which are supplied to a control unit (ST) for regulating a swiveling transversely to the travel direction, characterized in that the difference between the ground clearance signals (SR,SL) is used for regulating the swiveling, and the ground clearance signals mean value (SR, SL) serves as am actual-value component for a regulation of a cutting height of the mowing bar (2).

2. A regulating apparatus as defined by claim 1, characterized in that disposed on said harvester is a ground pressure signal transducer (34), the ground pressure signal (SB) of which, in combination with the mean value of the ground clearance signals (SR, SL), serves as an actual value for regulating the cutting height.

3. A regulating apparatus as defined by claim 2, characterized in that the ground pressure signal (SB) makes up approximately 80% and the means value makes up approximately 20% of the actual value.

4. A regulating apparatus as defined by claim 2, characterized in that the ground pressure sensor (34) reports the prevailing clearance between the hydraulic cylinder (31) and a support on which the hydraulic cylinder (31) is supported via a compression spring (35).

5. A regulating apparatus as defined by claim 1 characterized in that the control apparatus (ST) comprises comparators (V1, V2) having hysteresis, the outputs of which act upon electromechanical hydraulic valves (VT, VH; VL, VR), which control the hydraulic cutting-height cylinders (30, 31) and hydraulic swivels (20, 21) for left or right swiveling.

6. A regulating apparatus as defined by claim 5, characterized in that the outputs of the comparators (V1, V2) are interlocked to prevent simultaneous activation.

7. A regulating apparatus as defined by claim 5, characterized in that manually actuatable control contacts (KT, KH; KL, KR) are connected parallel to the comparator outputs.

8. A regulating apparatus as defined by claim 1, characterized in that the ground scanners (40–47), comprise ultrasonic sensors or elastic scanner hoops (40, 41; 42, 43) parallel to the direction of travel, the spacing between which is greater than a tire width or furrow width, and which are connected in pairs by means of a maximum signal circuit or a coupling shaft (44, 45), the rotational angle of which is transmitted to scanning potentiometers (46, 47).

9. A regulating apparatus as defined by claim 1, characterized in that the ground scanners (40A-49) on the support of a flexible cutter bar (2) comprise parallel slide blocks (40A, 41A) secured to swivel arms (48), the swiveled position of the blocks being transmitted via respective lever arms (49) to the coupling shaft (44A), the rotational angle of which is transmitted to the scanning potentiometer (46A), and that the swiveled positions of all the slide blocks (40A, 41A) is transmitted to a further coupling shaft with respect to the highest position at a given time of one of the slide blocks (40A, 41A), and the coupling shaft rotation at that time is transmitted to a height potentiometer.

10. A regulating apparatus as defined by claim 1, characterized in that the scanning means are each connected to a scanning potentiometer, the scanning signals of which, associated in pairs with respect to the prevailing maximum value, are evaluated as actual values.

11. A regulating apparatus as defined by claim 1 characterized in that an undercarriage inclination transducer signal (FNG) is supplied both to a riddle sifter regulating means and, as an actual value component, to the means for regulating the swiveling, so that a contrary swiveling is effected.

12. A regulating apparatus as defined by claim 1 further including a control unit (STD) which is a program-controlled processor to which transducer signals (SB, SR, SL, SNG, SV, SH) are supplied via a controllable multiplexer (MPX) followed on the output side by an analog/digital converter (AD), and to which clock signals of clock (CL), the signals of the control contacts (KR, KL, KH, KT), input contacts (TE, TA) and a vehicle speed signal (FGS) are supplied on an input side, and said processor having on its output side triggers for the valves (VR, VL, VH, VT).

13. A regulating apparatus as defined by claim 12, characterized in that a first subroutine cyclically samples, evaluates and stores in memory the input signals, a second subroutine compares the actual and set-point values, taking a specified hysteresis value into account, and as a function of the comparison activates the valve control outputs.

14. A regulating apparatus as defined by claim 13, characterized during that in the cyclical sampling of the control contacts (KR, KL, KH, KT), the associated output is deactivated at least briefly compared with the valve reaction time.

15. A regulating apparatus as defined by claim 14, characterized in that a scanning pulse train of the control contacts (KH, KT) is evaluated as to closing and opening times, and upon the occurrence of a first specified pulse train, the associated measured actual value at that time is stored in memory as a set-point value, and this set-point value is either specified or not further specified for ensuing regulation, as a function of the occurrence of a different agreed-upon pulse train.

16. A regulating apparatus as defined by claim 13, characterized in that as a function of the actuation of one of the input contacts (TE), a first or second operating state is specified, wherein in the first, the ground pressure signal (SB) and in the second, a vertical position signal (SH) of the mowing bar (2) and optionally a height signal (SV) of the ground scanners (40-43), for an actual value formation and the ground pressure set-point signal (SG) or a set-point height value (SH) for the cutting height regulation, are supplied, and wherein the operating state at a given time is output at a display lamp (LV, LL).

17. A regulating apparatus as defined by claim 13, characterized in that the input signals, associated with the outputs switched through at least briefly with respect to a valve reaction time, are evaluated first with respect to a lower threshold value, so that if the value fails to attain the threshold, an absence of valve function and valve voltage supply is ascertained, stored in memory and reported, and are evaluated second with respect to an upper threshold value, so that if the value exceeds the threshold an overload of the output switches is ascertained, which is used to switch off the output signal and report a malfunction.

18. A regulating apparatus as defined by claim 13, characterized in that the thermal valve loads are ascertained continuously by respective accumulation of the prevailing valve ON times with associated reduction of the accumulation value by a component proportional to the accumulated load, and if a specified load limit value is exceeded a shutoff and signal emission takes place.

19. A regulating apparatus as defined by claim 18, characterized in that as a function of the ascertained valve load and of the travel speed signal (FGS), the specified hysteresis values and/or the regulating idle times after which a new switching on of a valve takes place are specified.

20. A regulating apparatus as defined by claim 18, characterized in that as a function of the travel speed signal (FGS), the specified hysteresis values and the regulating idle times after which a new switching on of a valve takes place are specified.

21. A regulating apparatus as defined by claim 18, characterized in that as a function of the ascertained valve load and of the travel speed signal (FGS), the regulating idle times after which a new switching on of a valve takes place are specified.

22. A regulating apparatus as defined by claim 12 characterized in that in each case after activation of an output signal, the associated transducer signal (SB, SR, SL) is measured after a first waiting period (T1) has elapsed, which period is longer than a regulator reaction time, and is compared with the previous transducer signal (I1) with respect to a tolerance value (DW), and whenever such a variation has taken place, a comparison with a final value (IE) stored in memory is effected, and if the final value (IE) was attained, then after a further waiting period (T2) a new measurement of an actual value (I3) takes place, upon which a new comparison with the final value (IE) takes place, and if this actual value (I3) differs from it, then that value is stored in memory as the final value (IEN) to be used later, and that furthermore, if the comparison after the first waiting period (T1) did not show any change, a comparison of the measured actual value (I2) with the final value (IE) stored in memory is effected, and if this difference has resulted, the value is stored in memory as the new final value (IEN), and wherein whenever the set-point value is attained or whenever the final value (IE) had been attained, before leaving the subroutine, the associated regulator output is deactivated.

23. A regulating apparatus as defined by claim 12 characterized in that the respective measured transducer values (SB, SL, SR) are compared with upper and lower specified threshold values, and if those values are exceeded or unattained the further evaluation of the applicable transducer value does not take place and a substitute variable for it is specified, and otherwise the transducer values (SB, SL, SR), standardized and linearized as to zero-point location and range variable with respect to the various upper and lower final values (IE) stored in memory, are supplied to the regulation means.

24. A regulating apparatus as defined by claim 12 characterized in that all the occasions where the threshold value was exceeded and all the final-value operating states are statistically detected, and switching frequencies and ON times are detected in cumulative form and stored in memory, so that they can be called up to a display device (AA) by the operator by an output subroutine, and that the standardized ground pressure values and vertical position values are shown to the operator continuously on the display device (AA).

25. A regulating apparatus as defined by claim 12 characterized in that the ON and OFF times of the various regulator outputs are compared by autocorrelation over specified lengths of time, and as a function of the mass of the periodicity the associated hysteresis values and the associated regulation idle times are varied.

26. A regulating apparatus as defined by claim 12 characterized in that the regulations are effected with a proportional-integral-differential characteristic, in that in a cyclically run-through subroutine, the prevailing actual value (X) is compared with the set-point value (W), and the variation (DX) over time of the actual value is compared with a second comparison value (W2) and a temporal integral value (IX), which is continuously formed over a specified integration time by summation of the various variations (DS), is compared with a third comparison value (W3), whereupon if the set-point value (W) fails to be attained the regulator output is activated, but if both comparison values (W2, W3) are simultaneously exceeded then the regulator output is deactivated, and moreover if the threshold value (W) is exceeded the regulator output is deactivated, but if both comparison values (W2, W3) fail simultaneously to be attained, the regulator output is activated.

27. A regulating apparatus as defined by claim 12, characterized in that the ON and OFF times of the various regulator outputs are compared by autocorrelation over specified lengths of time, and as a function of the associated regulation idle times are varied.

28. A regulating apparatus as defined by claim 12, characterized in that all the occasions where the threshold value was exceeded and all the final-value operating states are statistically detected, and switching frequencies and ON times are detected in cumulative form and stored in memory, so that they can be called up to a display device (AA) by the operator by an output subroutine, and that the vertical position values are shown to the operator continuously on the display device (AA).

* * * * *